Oct. 28, 1924.  
H. M. PFLAGER  
MOTOR TRUCK  
Filed June 17, 1922   2 Sheets-Sheet 1
1,513,345
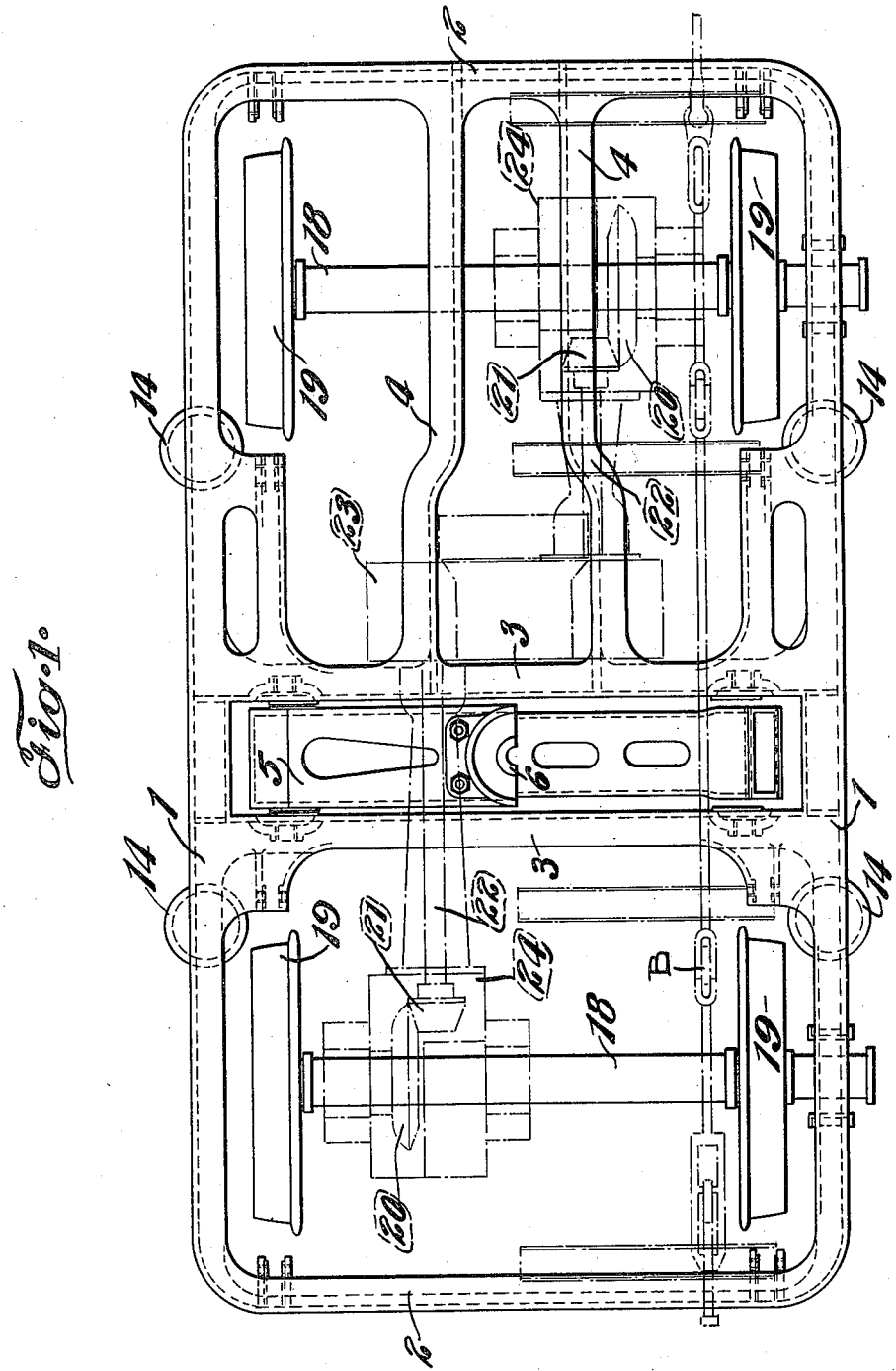
INVENTOR
HARRY M PFLAGER.
ATTORNEYS Oct. 28, 1924.
H. M. PFLAGER
MOTOR TRUCK
Filed June 17, 1922   2 Sheets-Sheet 2
1,513,345
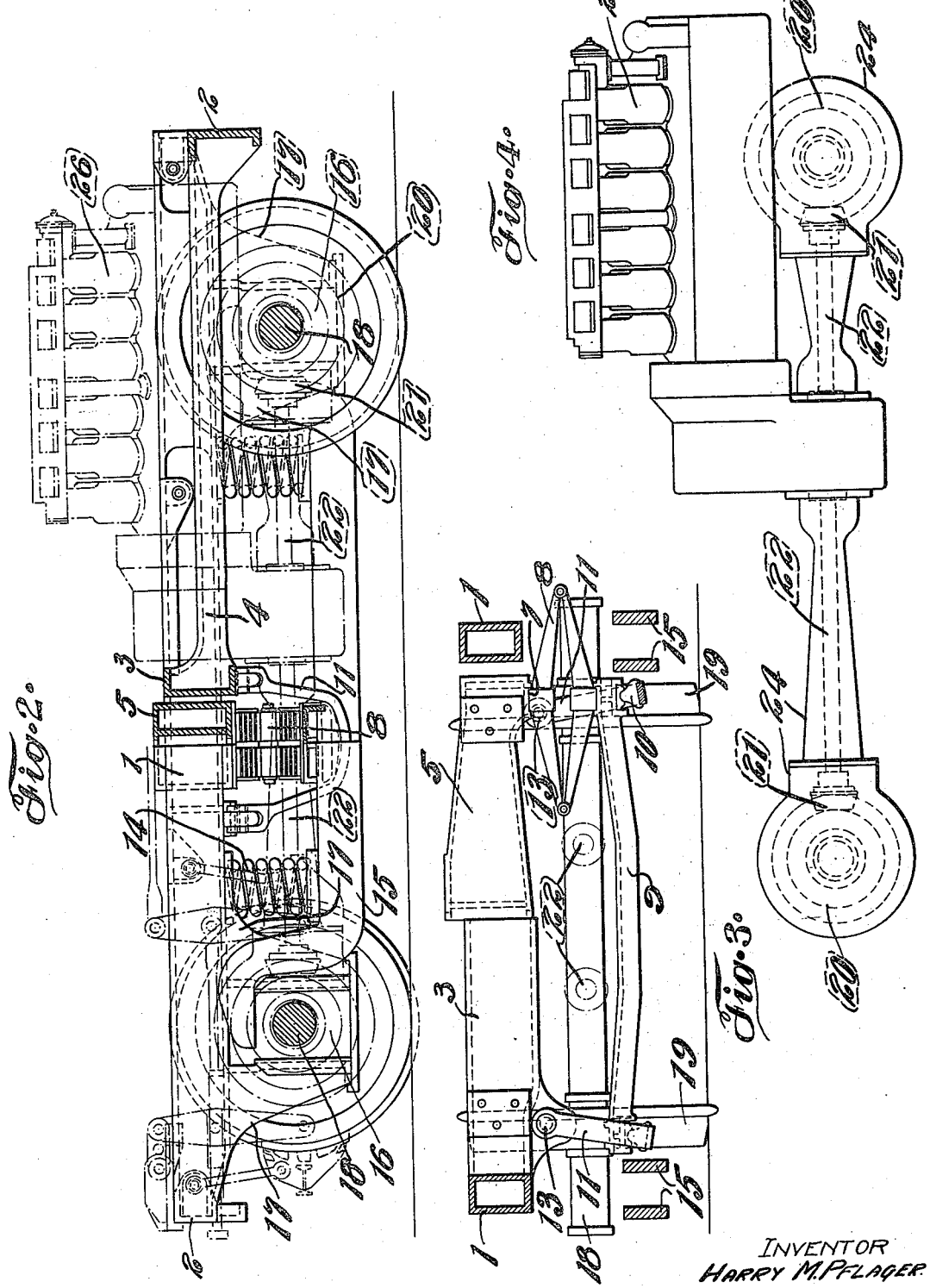
INVENTOR
HARRY M. PFLAGER
BY Cornwall, Cadell & Janin
ATTORNEYS Patented Oct. 28, 1924.

1,513,345

UNITED STATES PATENT OFFICE.

HARRY M. PFLAGER, OF ST. LOUIS, MISSOURI, ASSIGNOR TO COMMONWEALTH STEEL COMPANY, OF ST. LOUIS, MISSOURI, A CORPORATION OF NEW JERSEY.

MOTOR TRUCK.

Application filed June 17, 1922. Serial No. 569,144.

*To all whom it may concern:*

Be it known that I, HARRY M. PFLAGER, a citizen of the United States, residing at the city of St. Louis and State of Missouri, have invented a certain new and useful Improvement in Motor Trucks, of which the following is a full, clear, and exact description, such as will enable others skilled in the art to which it appertains to make and use the same, reference being had to the accompanying drawings, forming part of this application, in which—

Figure 1 is a top plan view of my improved motor truck.

Figure 2 is a side elevational view of the same, partly in vertical section.

Figure 3 is a vertical sectional view taken substantially at the center of the truck, the left hand portion omitting the bolster.

Figure 4 is a diagrammatic view illustrating the driving connections between the motor and the wheel axles.

This invention relates to a new and useful improvement in motor trucks and is of the type shown in a companion application filed by me of even date herewith, Serial Number 569,146.

The object of my present invention is to construct a motor truck frame and engine mount of cast steel whereby the motor may be mounted on the truck frame, to one side of the center thereof, to operate, through suitable transmission gearing, countershafts extending in opposite directions from the transmission gearing casing to driving gears on the truck axles, respectively, whereby both of said truck axles are directly geared for positive drive to the motor. To provide space for the motor and transmission gear casing, I arrange the truck bolster parts to one side of the center of the truck frame.

In the particular type of truck shown, the axle bearings are located outside of the wheels, as usual, but there are no connecting rods or pitmans connected to the truck wheels as disclosed in the companion application aforesaid. The truck is equipped with a conventional type of internal combustion engine with the usual friction clutch and selective gear shift, whereby both axles are positively and directly driven. The motor employed may be of any commercial type, and preferably is capable of generating from three to six hundred horse-power, depending upon the grades encountered and the load to be hauled.

In practice, there is usually a truck under each end of the car, and each of these trucks may be motor-equipped with controlling means therefor extending through the platform of the car and into a vestibule or cab located at the end or ends of the car. Each car thus becomes a self-contained motor driven unit and may be employed on side, branch and tap lines, as they are sometimes called, in hauling or delivering freight to the main lines. Being of standard gauge and having standard equipment, such a motor car can be coupled to a train on the main line for a long haul. The motor car, of course, will take care of the shorter hauls, and by replenishing the liquid fuel, may make hauls of greater or less distance.

I have illustrated an internal combustion engine as a form of motive power used, but it is obvious that other types of motors could be employed. Where the road is electrified, electric motors could be used.

In the drawings, the truck frame is shown as being made of a single casting, preferably steel, in which 1 indicates the side members, 2 the end members, and 3 the transom members. The side members are preferably box-shaped in cross-section (as shown in Figure 3) while the end and transom members are substantially channel shape (see Figure 2), said end and transom members being provided with perforated lugs for the attachment of the brake rigging, the pull rods of which are indicated at B, Figure 1.

4 are channel-shaped longitudinally disposed members extending from one of the end members 2 to one of the transom members 3, said members 4 forming a support for the motor or engine casing and being preferably more widely spaced apart at their inner ends to accommodate the transmission gear casing, as indicated.

5 indicates the bolster having the usual center bearing 6, said bolster having spring seats 7 near each end resting upon springs 8, shown in this instance as elliptic springs. Springs 8 rest upon spring plank 9 which in turn is supported by a cross-member 10 of supporting links 11. These supporting links (see Figure 2) co-operate with pins 13 passing through bearings extending from the lower faces of the transoms 3.

14 indicate frame supporting springs resting upon spaced equalizer bars 15, the ends of said bars being eccentric in shape and supported by the journal boxes 16. These journal boxes are arranged between pedestal jaws 17 extending downwardly from the side frame members 1, and preferably the equalizer bars 15 are arranged on each side of the pedestal jaws.

18 indicates wheel axles and 19 the wheels, each axle 18 being provided with a gear 20 meshing with a pinion 21, said pinions being driven through shafts 22 leading from the transmission gear casing 23 and extending between bolster 5 and spring plank 9. Gears 20, pinions 21 and shaft 22 are preferably encased by housings 24.

The transmission gear casing is supported upon the inner ends of members 4 and juxtaposed to the engine frame provided with its usual complement of cylinders 26. The controlling devices for the engine are not shown, but these preferably extend into a cabin or vestibule at the end of the car, and may be manipulated in a well known manner. It will be noted that the motor is directly connected to both axles and consequently bears direct driving relation thereto. The motor and transmission gearing may have a vertical movement relative to the axles or vice versa, but as the gear housings 24 are pivotally mounted on their axles, respectively, they will permit this without materially disturbing the alinement between the shafts 22 and their driving pinions in the transmission gear casing.

What I claim is:

1. The combination of a truck frame, its wheels and axles, a motor mounted on said frame, a transmission gear casing juxtaposed to said motor, and shafts spaced from each other transversely of the truck extending from said casing in opposite directions and geared to said axles.

2. The combination of a truck frame, its wheels and axles, said truck frame having longitudinally disposed supporting members more widely spaced apart at their inner ends, a motor supported by said members at one end, a transmission gear casing supported by said members at their opposite ends, shafts extending from said casing in opposite directions and geared to said axles, and casings pivotally mounted on said axles for enclosing said axle gearing and their driving shafts.

3. A motor truck frame comprising side, end and transom members, and motor supporting members extending between one of said end members and one of said transom members, said motor supporting members being more widely spaced at one end than at the other.

4. A motor truck frame comprising side, end and transom members, perforated lugs on certain of said members for the attachment of brake beams, a bolster located between said transom members and to one side of the center line of said truck frame, and longitudinally disposed motor supporting members extending between one of said end members and one of said transom members.

5. In a truck, a frame, a bolster, a spring plank, wheeled axles, a motor mounted on said frame, a transmission for said motor and drive shafting from said transmission to said axles, a portion of which shafting passes between said bolster and spring plank.

6. In a truck, spaced wheeled axles, a frame, a bolster between one end of the said frame and the center thereof, a motor mounted on said frame between the other end of the frame and the center thereof, a transmission casing between said motor and bolster and between said axles, and drive shafts from said transmission casing to each of said axles.

7. In a truck, a frame, wheeled axles, a motor positioned over the longitudinal center line of the truck, transmission mechanism for said motor, and drive shafts from said transmission to said axles located on opposite sides of the longitudinal center line of the truck.

In testimony whereof I hereunto affix my signature this 12th day of June, 1922.

H. M. PFLAGER.